MULTICHANNEL COMMUNICATION SYSTEM

Filed Dec. 11, 1945 6 Sheets-Sheet 1

Inventors
CARL M. RUSSELL
KEITH R. SYMON

By Murray O. Hayes

Attorney

MULTICHANNEL COMMUNICATION SYSTEM

Inventors
CARL M. RUSSELL
KEITH R. SYMON

By Murray O. Hayes
Attorney

April 12, 1955 C. M. RUSSELL ET AL 2,706,251

MULTICHANNEL COMMUNICATION SYSTEM

Filed Dec. 11, 1945 6 Sheets-Sheet 3

Inventors
CARL M. RUSSELL
KEITH R. SYMON

By Murray O. Hayes

Attorney

April 12, 1955 C. M. RUSSELL ET AL 2,706,251

MULTICHANNEL COMMUNICATION SYSTEM

Filed Dec. 11, 1945 6 Sheets-Sheet 4

Inventors
CARL M. RUSSELL
KEITH R. SYMON

By Murray O. Hayes

Attorney

Inventors
CARL M. RUSSELL
KEITH R. SYMON

By Murray O. Hayes
Attorney

FIG. 5

| BEAT CRYSTAL FREQUENCY (MC) | | SELECTIVE AMPLIFIER (117) OUTPUT FREQUENCY FOR 25KC BEATS WITH BEAT CRYSTAL FREQUENCY | |
|---|---|---|---|
| CRYSTAL | FREQUENCY (DOUBLED) | LOWER | UPPER |
| 120 | 15,025 | 15,000 | 15,050 |
| 121 | 15,035 | 15,010 | 15,060 |
| 122 | 15,045 | 15,020 | 15,070 |
| 123 | 15,055 | 15,030 | 15,080 |
| 124 | 15,065 | 15,040 | 15,090 |

Inventors
CARL M. RUSSELL
KEITH R. SYMON

By Murray O. Hayes
Attorney

2,706,251

MULTICHANNEL COMMUNICATION SYSTEM

Carl M. Russell and Keith R. Symon, Washington, D. C.

Application December 11, 1945, Serial No. 634,339
4 Claims. (Cl. 250—36)
(Granted under Title 35, U. S. Code (1952), sec. 266)

This invention relates to multi-channel communication systems and in particular to a communication system employing a radio frequency carrier and selectively operable at any of a large number of channel frequencies occuring over a wide frequency range.

In many instances it is desirable to have a multi-channel communication system providing send and receive operation on any of a plurality of channels. In the past, systems have been available which operate similar to the familar dial telephone system providing a plurality of channels; however, these systems suffer from numerous disadvantages particularly where transmission by a radio frequency carrier is employed. Furthermore, in numerous installations, such as aboard aircraft, the space and weight requirements of many prior systems are prohibitive.

An object of this invention is to provide a communication system permitting selective operation at any one of a multiplicity of radio frequency carrier frequencies over a wide frequency range.

A further object of this invention is to provide a transmitter-receiver radio communication system in which a single signal generator functions as the master oscillator for the transmitter and as the local oscillator for the receiver.

A further object of the present invention is to provide a multi-channel communication system capable of automatic, accurate and rapid tuning to any one of many channel frequencies with a minimum of effort on the part of the operator.

A further object of this invention is to provide a multi-channel communication system readily operable at any of a plurality of channels and providing certain selectable channels to which operation may be changed in a short period of time and with minimum effort on the part of the operator.

A further object of this invention is to provide a mechanism by which the operation of the aforementioned channel selective system is readily controllable.

Other objects and features of the present invention will become apparent upon a careful consideration of the accompanying drawing and following detailed description.

In the drawings:

Figs. 3, 3A, 3B, 3C show various views and details of a typical control box employed in the system shown in the block diagram of Fig. 1.

Fig. 5 is a table showing reference frequencies obtainable through the use of a secondary crystal oscillator with its five crystals of typical frequencies.

In accordance with the fundamental concepts of the present invention, a send-receive radio communication system is provided capable of selective operation at a plurality of carrier frequencies occurring over a wide frequency range. To produce the basic radio frequency signal for the transmitter and the local oscillator signal for a superheterodyne receiver system, a master oscillator of variable frequency is employed. Whenever it is desired to select a carrier frequency, the master oscillator is tuned to a known initial frequency and then retuned slowly in a known direction of changing frequency. As the master oscillator is retuned, successive zero beat points with the harmonics of the frequency of a signal from a second signal generator are passed. These zero beat points are counted and, after a predetermined number of points has been passed, the frequency sweep is altered. An additional oscillator and mixer system provides a means for shifting the zero beat frequency points by a known frequency and thereby altering the position of the final zero beat point in the vicinity of which the master oscillator is to be maintained, despite tendency toward frequency drift.

Since the channel frequency is established by the master oscillator when transmitting and is by necessity different from the required local oscillator frequency when receiving on the same channel, with a superheterodyne receiver, by an amount equal to the intermediate frequency, means is provided, when receiving, to shift the beat point of oscillator maintenance by the amount required for the production of the heterodyne intermediate frequency signal in the receiver.

Figure 1:
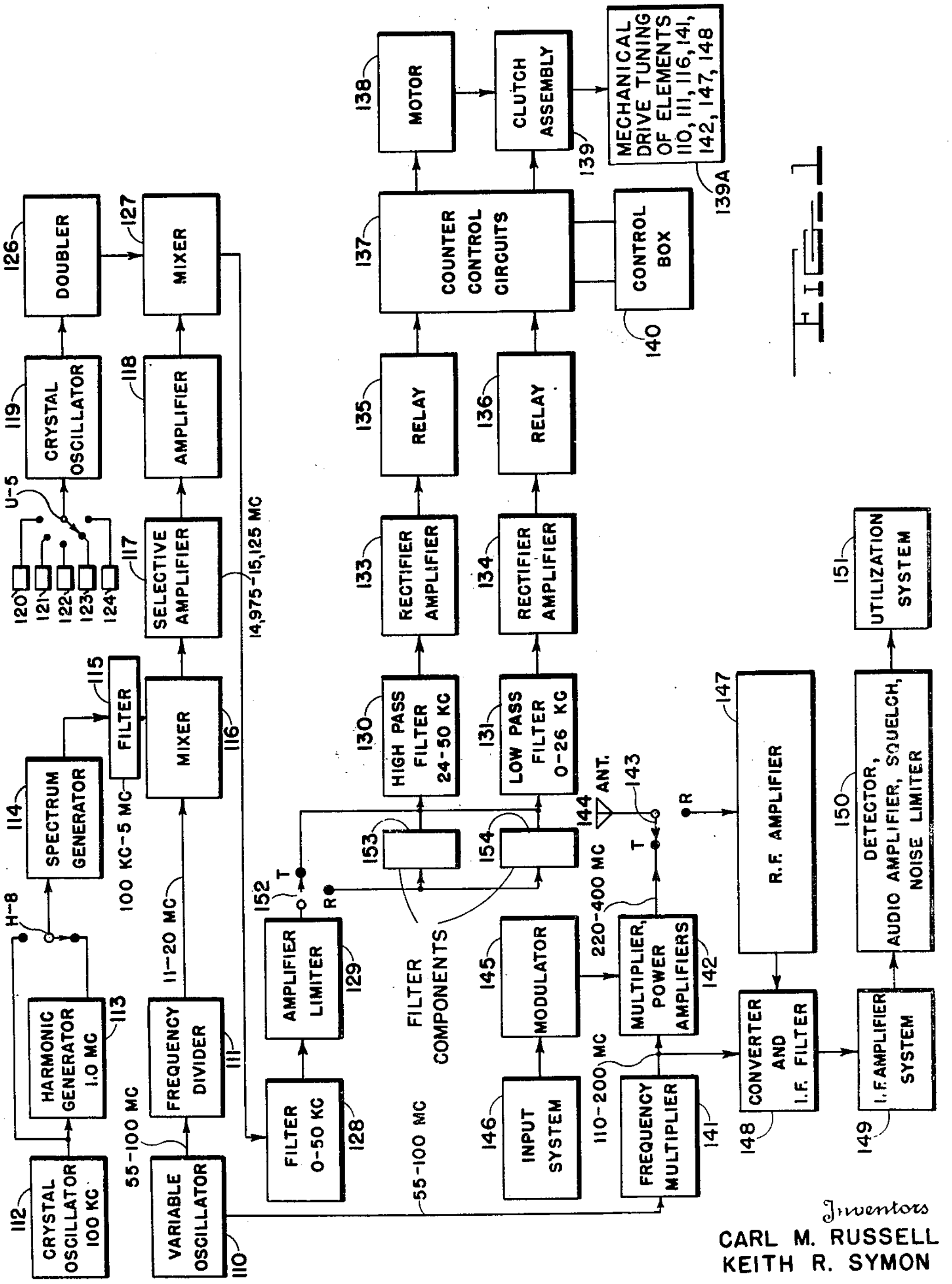
Fig. 1 shows in block form one embodiment of the features of the present invention.

In the typical embodiment of the invention, as shown in Fig. 1, a communication system is provided which furnishes, with frequencies as indicated in Fig. 1, approximately nine hundred communication channels spaced 200 kc. apart in the range 220–400 mc. These frequencies and other frequencies given throughout the specification are exemplary only and not to be taken as limiting in any way the applicability or range of the equipment. A variable oscillator 110 furnishes a master oscillator signal for the transmitter section and a local oscillator signal for the receiving section.

The variable oscillator signal, typically in the range of 55–100 mc. is first subjected to frequency division by a factor of five to obtain a lower frequency, more easily handled signal. In this specific embodiment the frequency divider therefore provides an output signal variable over the range of 11–20 mc., effecting frequency division by a factor of 5.

A second oscillation generator 112, crystal controlled, provides a reference frequency of 100 kc., the harmonics of which are subsequently compared with the frequency of the output signal from the variable frequency oscillator 110 to determine the frequency of the signal from the variable oscillator.

The 100 kc. signal thus generated is applied to a "spectrum" generator 114 either directly or through a harmonic generator 113, depending upon the position of switch H–8. The spectrum generator 114 functions to produce a series of harmonics of the input frequency at each multiple thereof up to 5 mc. Suitable spectrum generators are well known in the art, typical of these is a blocking oscillator operated in synchronism with the input frequency. With switch H–8 in the upper position (in Fig. 1) the output of the spectrum generator will contain a signal at every whole number multiple of 100 kc. A harmonic generator 113, operating from the output of the crystal oscillator 112, produces the tenth harmonic of the signal from the crystal controlled oscillator 112 which is 1.0 mc. When switch H–8 is in the lower position (in Fig. 1) the 1.0 mc. signal from the harmonic generator 113 is applied to the spectrum generator 114 so that the output signal of the latter stage will contain a frequency component at every whole number multiple of 1.0 mc.

The output signal components from the spectrum generator 114 are applied through a low pass (5 mc. cutoff) filter 115 to the mixer 116. Also applied to mixer 116 is the 11–20 mc. variable signal from the frequency divider 111. Heterodyne action in mixer 116 produces a multiplicity of sum, and difference frequencies. The resulting heterodyne frequencies occurring in the band 14.975 to 15.125 mc. are then amplified by a selective amplifier system 117 and applied to a second amplifier 118. Thus only those frequencies occuring in the specified frequency range of 14.975 to 15.125 mc. are amplified.

The beat frequencies passed by the selective amplifier 117 fall in the middle of the range (11–20 mc.) over which the output of the frequency divider 111 is varied. To prevent the mixer 116 from operating as a straight-through amplifier in the vicinity of 14.975–15.125 mc. with gain greater than when functioning as a mixer, a balanced mixer construction employing two non-linear elements in opposition with push-push input of the signal from 111 and push-pull input of the signal from 114 is preferable. This type of mixer usually provides suppression of the push-push input signal. Complete cancellation of this input signal is not desired because the 14.975–15.125 mc. straight through signals would then be eliminated. The balanced push-push input is therefore unbalanced sufficiently to provide equal signal amplitudes when operating as a mixer and as a straight-through amplifier.

A third oscillation generator 119, crystal controlled by any one of a plurality of crystals 120, 121, 122, 123, 124 selectable according to the position of switch U–5 provides a third signal. The frequency of this third signal is doubled in a suitable means 126 provided for that purpose and applied to a second mixer unit 127 to which is also applied the signal from the amplifier 118. In the typical case as shown in Fig. 5 the crystals 120, 121, 122, 123, 124 were selected to apply signals of 15.025, 15.035, 15.045, 15.055 or 15.065 mc. respectively to mixer 127 depending upon the position of switch U–5. The resulting heterodyne beat signals produced between the 14.975–15.125 kc. signal from amplifier 118 and the signal from 126 as a result of the non-linear action of the mixer 127 are applied through a low pass filter 128 to an amplifier-limiter stage 129. Filter 128 is constructed to provide attenuation of all frequencies above 50 kc.

The output signal from amplifier 129 is applied through switch 152 to a high pass filter 130 and a low-pass filter 131. By selecting the cross-over point of these two filters as 25 kc. the two filter sections will be equally responsive to a signal from amplifier 129 whenever a frequency beat of 25 kc. is produced in the mixer 127. If the beat frequency is above 25 kc. the output of the high pass filter is greater, below 25 kc. the output of the low pass filter is greater. It is therefore apparent that the amplitude of the output signal from the filters 130, 131 is primarily dependent upon the frequency of the input signal, provided that the amplitude of the input signal is constant over the frequency range employed. Therefore it is essential that tube 129 function as a limiter as well as an amplifier.

The output signals from filter 130 are applied through the amplifier and rectifier 133 to a relay 135. Similarly, the output signals from filter 131 are applied through the amplifier and rectifier 134 to a relay 136. Thus when the output signal from amplifier 129 is above a certain frequency, amplification and rectification by unit 133 will result in actuation of relay 135, and conversely, a signal below another certain frequency will result in the actuation of relay 136. The actuation of relays 135, 136 in the vicinity of beat points in turn operates the counter-control mechanism 137, which, through motor 138, the clutch assembly 139 and the drive mechanism 139A, regulates the tuning of the variable frequency units in the system, notably oscillator 110. For reasons which will be seen later it was found desirable to have relay 135 operate slightly below the cross-over frequency of 25 kc. and for relay 136 to operate slightly above 25 kc. Thus there is a narrow region of frequencies about 25 kc. in which both relays 135 and 136 are actuated. This overlapping operation is secured by adjusting the rectifier-amplifier units 133, 134 so that relays 135, 136 will close with the amplitude of the filter output signals reached below, or above, respectively, the cross-over point of 25 kc.

When it is desired to establish operation of the communication system at a particular carrier frequency, the process is started from the control box 140. In the initial stages of the channel selection process, this unit sends a series of signals to the counter-control circuits 137. Upon receipt of the first of these signals the control circuits 137 operate the clutch assembly 139 permitting the tuning elements located in units 110, 111, 116 and in the transmitter-receiver sections to retune the various gang tuned circuits to their lowest frequency position. Further signals from the control box 140 and from circuits 137 then cause an upward sweep in the frequency of the tuned circuits previously mentioned. In the upward frequency sweep, beat signals are produced between the signal from the frequency divider 111 and the signal from the spectrum generator 114 as each multiple of 1 mc. or 100 kc. (depending upon the position of switch H–8) is reached. These beats are "counted" by suitable mechanism in circuits 137. After a preselected number of 1 mc. beat points is counted, the rate of upward frequency sweep is lowered. After a subsequent 1 mc. beat point is counted operation is changed to the 100 kc. beat points. Again after a preselected number of 100 kc. beat points is counted, the frequency sweep rate is again lowered, and operation is changed to a high-low frequency stabilization to control the oscillator 110 so that operation at a particular frequency on a particular beat point is maintained.

With the frequency of the variable oscillator thus established, conventional processes of frequency and power multiplication occur in units 141, 142 to produce the radio frequency carrier signal to be radiated by antenna 144 when the transmit-receive switch 143 is in the transmit position. Modulation of the radio frequency carrier is accomplished by conventional methods through the input amplification system 146 and the modulator 145.

When receiving from a distant signal source, the antenna switch 143 connects the antenna 144 to the radio frequency amplifier 147. For reception, the switch 152 is also placed in the receive position, adding the sections 153, 154 to the high and low pass filters respectively. The addition of these sections alters the characteristics of the filters so that the cross-over point is changed by 7 kc. This change in the filter cross-over frequency operates relays 135, 136 to cause a retuning of the oscillator 110 and the other tuned circuits. Since a frequency division of 5 occurs in the divider 111 and a multiplication of two in each of units 141 and 142, a 7 kc. change in filter cross-over frequency as a result of the operation of switch 152 results in the production of a receiver local oscillator signal removed from the transmitter carrier frequency by 140 kc. the intermediate frequency.

For reception, the 110–200 mc. signal from the first frequency multiplier 141 is applied to a converter 148 which, by suitable design, will produce a heterodyne intermediate frequency signal of 140 kc. from the beat of the second harmonic of the 110–200 mc. signal from multiplier 141 with the 220–400 mc. signal from the radio frequency amplifier 147 when the signal from another transmitter operating on the same channel frequency is being received. The 140 kc. I.-F. signal is applied to a suitable selective amplifier system 149 and thence to a conventional detection, audio amplification, squelch, and noise limiting section 150. The detector circuit of section 150 functions to reproduce the modulation contained upon the radio-frequency signal emitted by a distant transmitter. The audio amplification system provides voltage and power amplification of this modulation so that it is capable of operating a utilization system 151 which may be, for example, a loudspeaker. The squelch circuit and the noise limiting circuit function to prevent excess noise from reaching the utilization system, the former causing suppression of output when the input signal becomes so weak as to be indistinguishable over the general noise level, the latter causing momentary suppression of output upon reception of particularly strong bursts of noise.

Figure 2:
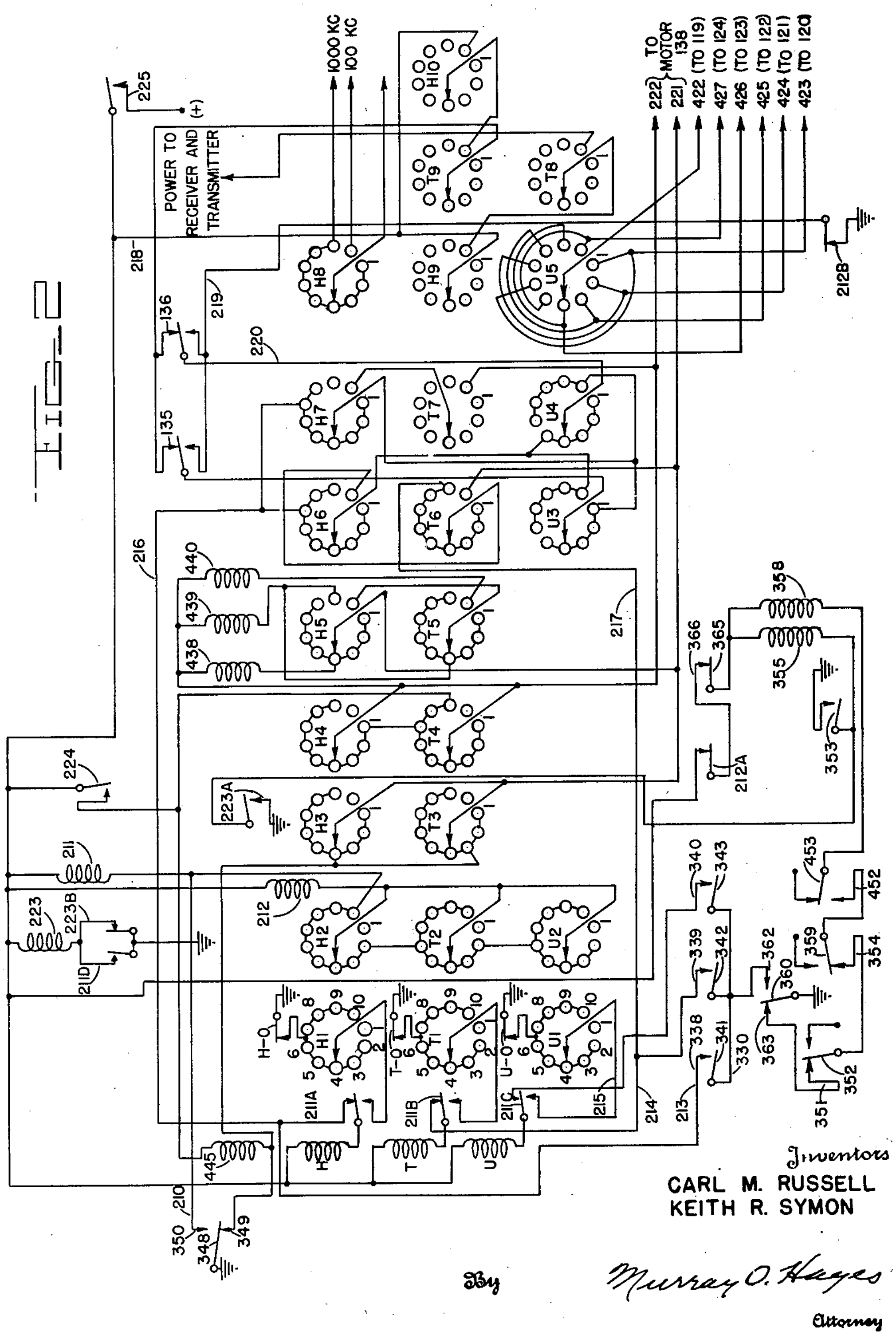
Fig. 2 is a schematic diagram of a typical counter control circuit and control box employed in the block diagram of Fig. 1. (The 200-series numbers are located in the counter control section and the 300-series numerals apply to the components located in the control box mechanism.)

A typical counter control mechanism 137 is shown in detail in Fig. 2 wherein connections to and in a separate control box 140 (Figs. 3, 3A, 3B and 3C) are shown, as are the connections to a reversible motor 138, control relay coils in a multiple clutch assembly 139 (Figs. 4, 4A and 4B) and the contacts of relays 135 and 136.

With reference to Fig. 2, the control circuits as shown therein consist preferably of a plurality of multi-pole, multi-contact, rotary relay operated switch units identified by their field coils H, T, U. Contact segments operated by each switch unit are indicated by suffixed numerals. These switches are rotatable in one direction, clockwise as shown in Fig. 2, in steps of 36 degrees upon energization and deenergization of any of the respective coils H, T, U. Rotation of the H series and T series switches is produced by the relay field coils H, T, either by signals from the control box 140 or by operation of relays 135, 136 (which are deactuated as shown in Fig. 2) as beat points are passed. Rotation of the U series switches is produced solely by signals from the control box 140. In the particular embodiment as shown, operation with approximately 900 channels is provided with three relays and three input channels. If a larger number of channels are required additional relays and input circuits or additional contact positions on the relays would be required.

The switch series H, T, U, provide respectively the selection of the hundreds, tens and units digits of the channel number. They control the selection of the 1.0 mc. or 100 kc. beat point spacing, the variable speed operation of the clutch assembly 139, reversible operation of the tuning motor 138, the selection of the particular position above or below a zero beat point at which the oscillator 110 is to be maintained, selection of a particular one of crystals 120, 121, 122, 123, 124, and the application of power to the transmitter and receiver sections.

At the start of the channel selection process, contact between bars 348 and 349 (Fig. 2) is broken in the control box so that a master clutch relay holding coil 445 is disengaged. When this occurs, a spring 450 in the clutch mechanism Fig. 4A then returns the ganged tuning units of the various stages to an initial position.

In the initial stages of the channel selection process, switch sectors H–1, T–1, U–1 control the return of the switches operated by the coils H, T, U individually to position 1 as indicated on the drawing. This action is started as line 210 becomes grounded through bars 348, 350 in the control box. Relay 211 is thus energized moving the switch sections 211–A, 211–B, 211–C to their lower positions (as shown in Fig. 2), thereby applying voltage to coils H, T, U through the appropriate combination of 211–A, 211–B, 211–C, H–0, T–0, U–0, H–1, T–1, U–1. When voltage is first applied to the relay coils H, T, U, the respective armatures are energized and, upon removal of the voltage all contacts are advanced one position (36 degrees) in a clockwise direction. As each rotary armature is energized, mechanical means (not shown) causes an individual opening of the contacts H–0, T–0, U–0, deenergizing the relay coils and permitting, due to spring loading of the rotary armatures, a 36 degree counterclockwise armature rotation which, by suitable claw arrangement, is transmitted to the rotary switch contacts. As the rotary armatures return to their maximum counterclockwise position, the contacts H–0, T–0, U–0 are again closed causing a second energization of coils H, T, U. In this manner the rotary switches move in a clockwise direction until each reaches its indicated position number 1 at which position further energization of the coils through H–1, T–1, U–1 is not possible.

The second step in the selection process involves an advancement of the rotary switches by a series of pulses from the control box mechanism 140. With line 210 grounded in the control box and any of switches H–2, T–2, U–2 in any position other than 1, relay 212 is actuated, preventing, as a result of the opening of contacts 212–A, the application of power to the control box. When switches H–2, T–2, U–2 all reach their number one position, relay 212 is deactuated, closing contacts 212–A, thereby applying power to the control box. The control box mechanism then removes the ground from line 210 so that relay 211 is deactuated permitting the switches 211–A, 211–B, 211–C to return to their upper (Fig. 2) position. Subsequently the control box mechanism causes the grounding, in a manner to be described later, of lines 213, 214, 215 causing each relay unit to advance one position for each momentary completion of the circuit. By suitable arrangement provided in the control box, each line is grounded, individually, from zero to nine times so that the rotary switches are placed in any of their positions from one through ten.

The next step in the selection process involves a tuning of the ganged units, particularly the variable oscillator 110. In this process the tuned frequency of the affected circuits is caused to sweep upward, rapidly at first, then less rapid and finally slowly and with high-low frequency stabilization to prevent drift of the tuned frequency.

For the initial (high speed) frequency sweep, power is supplied to the tuning motor 138 through sections H–3, H–4, T–3, T–4 of the H series or T series switches when these are in any of positions one through nine.

Figures 4, 4A:
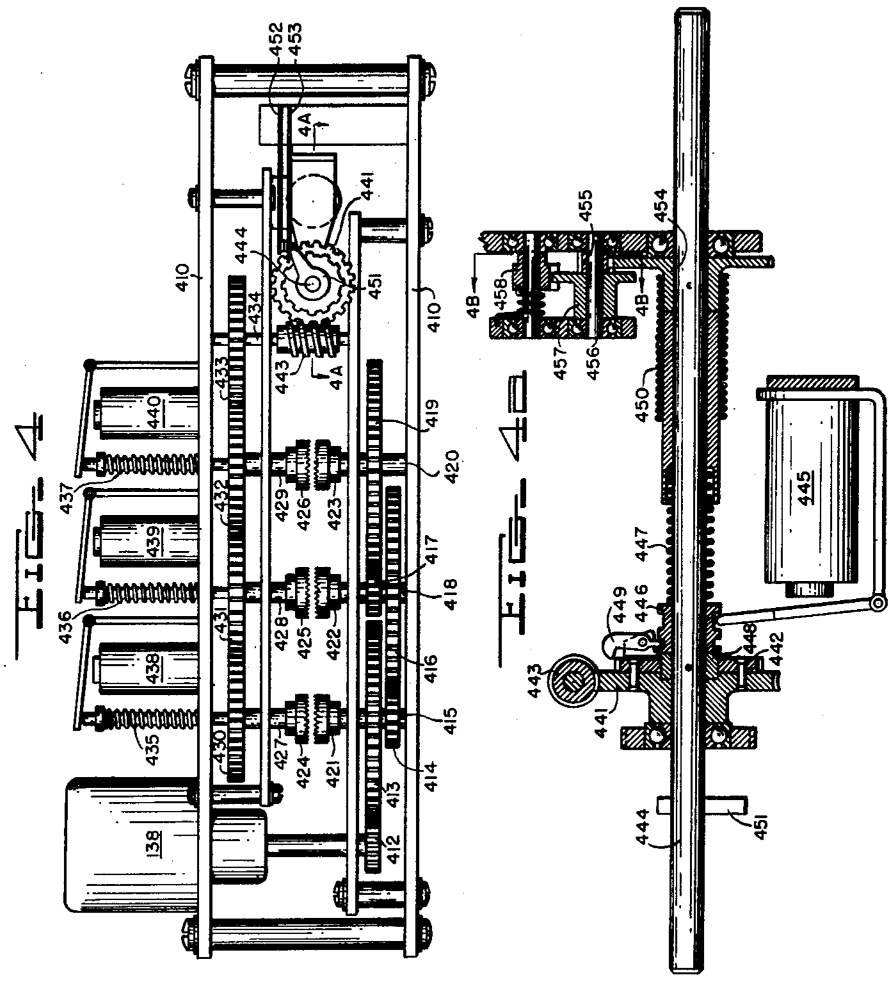
Figs. 4, 4A, 4B show various views and details of a variable speed, relay operated, clutch mechanism for tuning the variable frequency units of the transmitting and receiving system. The 400-series components are located in the clutch mechanism.

Variable speed operation of the tuning unit through the clutch mechanism of Fig. 4 is controlled by switches H–5, T–5. With switch H–5 in any of positions one through eight, a high speed clutch assembly is engaged by actuation of relay 438. With switch H–5 in position nine, a medium speed clutch assembly is engaged by actuation of relay 439. With switch H–5 in position ten and T–5 in any of positions one through nine, relay 439 also is actuated. With both H–5, and T–5 in position ten, the slow speed clutch assembly is engaged by actuation of relay 440.

As the variable oscillator 110 is swept in frequency, beat signals produced over the frequency range of 0–50 kc. are applied to the relays 135—136 (shown deactuated in Fig. 2) in a manner as previously described. Thus as a beat point is approached, relay 135 becomes energized at a frequency 50 kc. below the zero beat point and remains energized until a frequency slightly less than 25 kc. below that beat point is reached, at which point it is deactuated. Relay 136 becomes energized just before the 25 kc. beat frequency is reached, remains energized through zero beat and to the vicinity of the upper 25 kc. beat frequency where it falls out. Relay 135 again becomes energized at a beat frequency slightly less than 25 kc. and remains energized until the upper 50 kc. beat frequency is reached. With switch H–8 in any of positions one through nine for the 1.0 mc. count, both relays 135—136 then remain deactuated for 900 kc. until a second zero beat point is approached. With switch H–8 in position 10 for the 100 kc. count, the upper 50 kc. beat frequency for a first beat point mentioned above is also the lower 50 kc. beat frequency for a second beat point. Thus during the 100 kc. frequency sweep, the high pass relay 135 remains actuated from the upper 25 kc. beat frequency of a lower beat point, through the 50 kc. beat frequency and to the lower 25 kc. beat frequency of a second (higher) beat point.

During the initial part of the frequency sweep, with the H series switches in any of positions 1 through 8, actuation of either relay 135 or 136 grounds line 216 through contacts on H–6, H–7, U–3, U–4 causing the application of voltage to the coil H. Thus the armature operated by coil H is advanced 36 degrees to a new position upon deactuation of the relay. This action continues, with line 216 being grounded over a 100 kc. frequency band as each of the 1 mc. beat points is passed to insure ample time for the operation of relay H. When the H series switches reach position 9, operation of the tuning mechanism is changed from the fast clutch assembly operated by coil 438 to the medium clutch assembly operated by coil 439 by means of switch H–5. Under this condition the beat points are passed so slowly that 100 kc. closure of the relays is unnecessary. In this position only switch H–6 is capable of conducting so that beat point counting is with a single relay (135 or 136), however, movement of the H series switches to the final position 10 occurs as the next beat point is reached, choice of whether it is by relay 135 or relay 136 depending upon whether stabilization is desired at a frequency of 25 kc. above or below the zero beat point. The selection of the upper or lower beat frequency point is made by switches U–3 and U–4. With the U series switches in one of positions one through five, the grounding of line 216 is accomplished through U–4 resulting in the motion to the tenth position of the H series switches upon actuation of relay 136. With the U series switches in one of the positions six through ten, line 216 is grounded through U–3 resulting in the motion to the ten position of the H series switches upon actuation of relay 135.

As the H series switches move to position ten, the counting of beat points is transferred to the T-series switches by the connections to H–6 and H–7. The line 216 can no longer be grounded so that further stepwise motion of the H series switches is not possible. However, with switch T–6 in any of positions one through nine, the actuation of one of relays 135–136 (selected by switches U–3, U–4) through either U–3 or U–4, then through H–6 and T–6, grounds line 217 and the coil of relay T, so that subsequent deactuation of relay 135 or 136 causes a 36 degree advancement of the T series switches. (It should be noted that the medium clutch drive assembly operated by coil 439 is in use for these positions and that switch H–8 causes operation from the 100 kc. harmonics.) When both the series H and series T switches reach position ten, line 217 can no longer be grounded so that further motion of the series T switches is impossible. In this position also, power cannot be supplied to the tuning motor 138 and the variable speed clutches through switches H–3, H–4, T–3, T–4 and only the slow speed clutch assembly operated by coil 440 is capable of actuation. In this condition, then, the variable oscillator 110 is within approximately 40 kc. of the desired frequency so there can be no possibility of stabilization at a wrong 25 kc. beat frequency.

During the process of stabilization, with both the series H and series T switches in position ten, power is supplied to the motor 138 and the variable speed clutches from the positive supply line 218 and ground line 219. With series U switches in any of positions one through five, actuation of relay 135 and deactuation of relay 136 applies a positive voltage through line 220 and switches U–4, H–6, T–6 to the motor and relay supply line 221. The other supply line 222 is then grounded through switches T–7, H–7, U–3, relay 135 and line 219, causing actuation of the slow speed clutch assembly operated by coil 440 and rotation of motor 138 in one direction. In a similar manner actuation of relay 136 and deactuation of relay 135 will apply the positive voltage to line 222 and ground line 221 to cause actuation of the slow speed clutch assembly and the operation of motor 138 in a direction opposite to that of the previous case. If both relays 135—136 become energized or deenergized at the same instant, the result is that lines 222 and 221 will be at the same polarity so that actuation of clutch 440 and rotation of motor 138 is not possible.

With series U switches in any of positions six through ten, the polarity of the leads 222, 221 is reversed for the conditions of relays 135—136 as indicated above. This operation is necessary in view of the fact that operation with switches U–3, U–4, in any of positions one through five causes stabilization at a lower 25 kc. beat frequency so that actuation of the high frequency relay 135 will indicate that the frequency of the variable oscillator 110 is too low and cause the tuning motor to increase the oscillator frequency. Similarly, actuation of the low frequency relay 136 will indicate that the variable oscillator frequency is too high and cause retuning to a lower frequency. Stabilization at the upper 25 kc. beat frequency is desired with switches U–3, U–4 in any of positions six through ten. Under these conditions it is necessary that actuation of the low frequency relay 136 cause the variable oscillator 110 to be retuned to a higher frequency while actuation of the high frequency relay 135 will cause the variable oscillator 110 to be retuned to a lower frequency.

It should be noted that actual off-on operation of relays 135—136 at exactly 25 kc. is difficult to obtain and maintain and furthermore is not actually necessary. It was found desirable to provide for operation of the high frequency relay at a beat frequency slightly below 25 kc. and for operation of the low frequency relay at a frequency slightly above 25 kc. Thus a narrow frequency band around 25 kc. is provided in which both relays are actuated. This is not objectionable since, as previously described, simultaneous actuation of both relays removes power from the tuning motor. In practice it was found that a "dead" space width of about 150 cycles per second provided sufficient control of the frequency of the variable oscillator 110 while, at the same time, prevented excessive "hunting" of the tuning mechanism.

Other switches not previously mentioned are chiefly protective in function. Switches H–9 and T–8 apply power to the transmitting and receiving system components numbered 141 through 151 only after the H and T series rotary switches have reached position ten. This prevents application of high voltage to these components during the tuning process. Relay 223 is an undervoltage protective relay. Should for any reason, the supply voltage fall below a predetermined low limit, relay 223 becomes deenergized causing closure of contacts 223A and opening contacts 223B. This action results in the energization of relay 355 which produces a grounding of line 210 in a manner to be described later. Grounding of line 210 causes relay 211 to become energized closing contacts 211D. Thus relay 223 can again become energized and will hold through contacts 223B if the low voltage condition is corrected, if the condition still persists, relay 223 will not be energized upon closure of contacts 211D.

Another protective switch is 224. This switch, operated by thermal, time delay, or other relay means, not shown, provides protection when starting the equipment, and is necessary because the electron tubes associated with the various signal generators and counters, etc. require a certain amount of time to "warm-up," whereas the mechanical relays, switches, etc. are almost instantly operable when the main power relay 225 is closed. Therefore switch 224 with its time delay prevents the application of power to the stepper relay coils H, T, U and the tuning mechanism until such time as the tubes previously mentioned reach operating temperature.

Figure 3A:
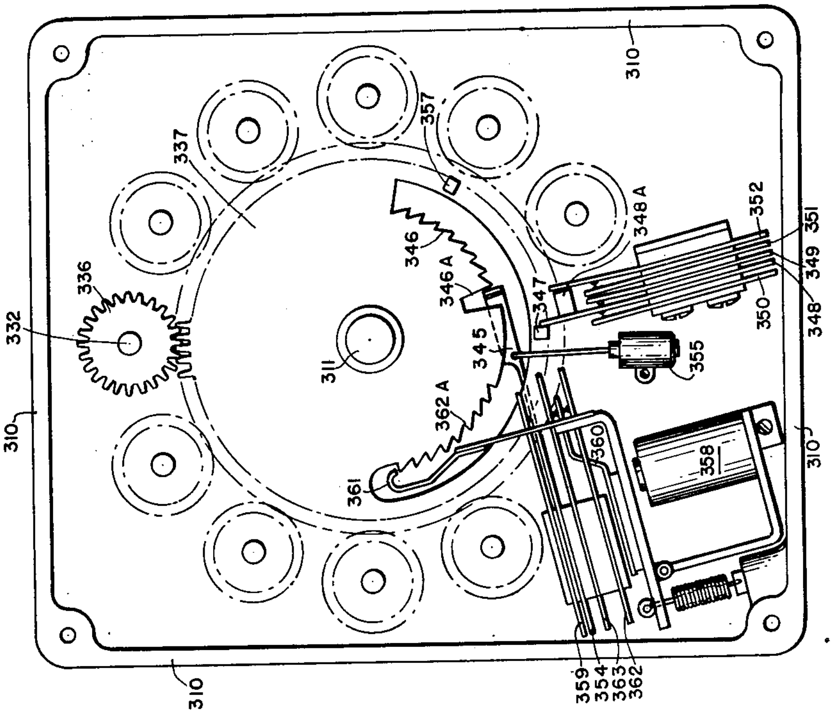
Figure 3:
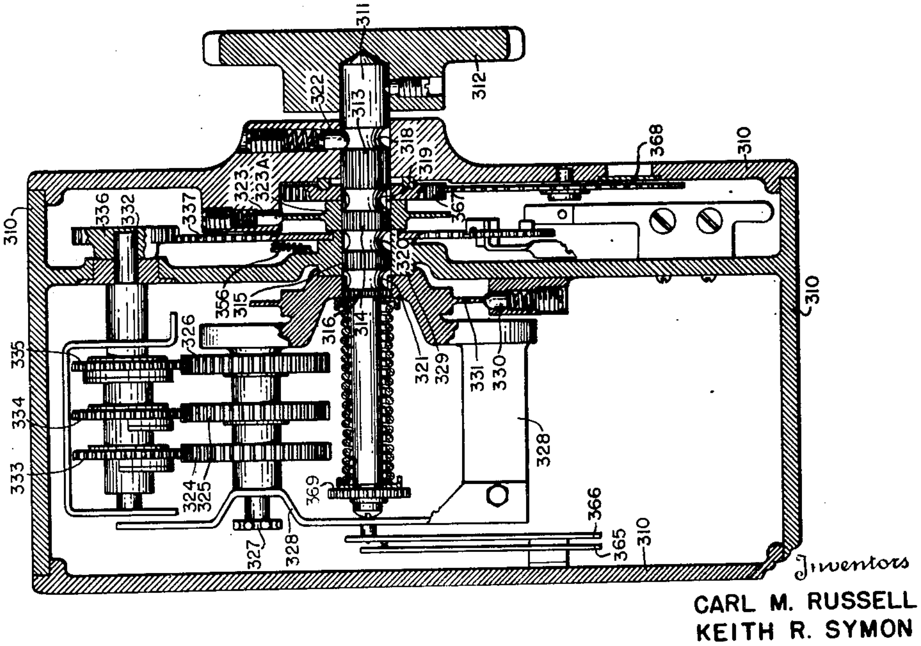
Figure 3A:
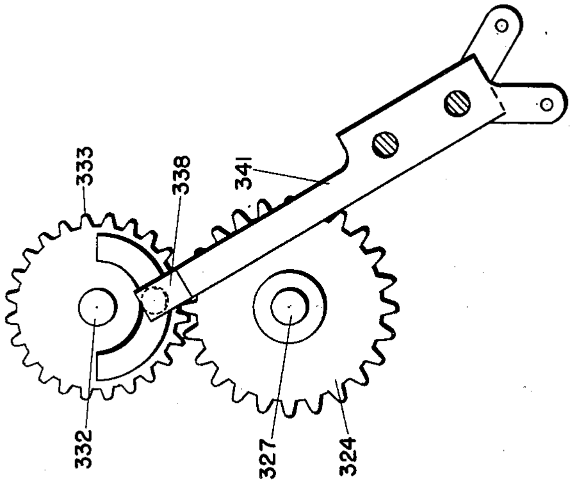

With particular reference now to Figs. 3 and 3–A in addition to Fig. 2, a control box mechanism suitable for operating the selector system is shown contained within a supporting and protective cover 310. A central shaft 311 slidably and rotatably mounted therein protrudes from the front side of the box 310. A knurled handwheel 312 is attached to the shaft 311 and provides a convenient external means for adjusting shaft 311. Shaft 311 is provided with five toothed raised portions 313, 314, 315, 316, which may engage other toothed members to provide rotation of these members by handwheel 312. Also on shaft 311 are four rounded, cutaway parts 318, 319, 320, 321 into any one of which a spring loaded slidable member 322 may engageably fit to secure shaft 311 against longitudinal motion. Outward motion of the shaft 311 is normally resisted by the spring loaded slidable member 322 but upon the application of sufficient force to handwheel 312, the slidable member 322 rises from slot 318, rides along the raised portion 313 as shaft 311 moves outward and falls into slot 319. Continuous application of force will then cause member 322 to move to slot 320, and then to slot 321. Rotational motion of shaft 311 is normally resisted by the spring loaded slidable member 323, operating in conjunction with a toothed wheel 323A mounted upon shaft 311 and rotatable therewith by internal teeth which may engage the toothed portions of shaft 311.

Three idler gears 324, 325, 326 are mounted upon a shaft 327 which in turn is supported by assembly 328. Assembly 328 is supported by massive bearing surfaces on member 329. The assembly 328 is held against rotary motion by a spring loaded slidable member 330 operating against a toothed portion 331 of assembly 328. Therefore rotation of assembly 328 is only possible by motion of the spring loaded slidable member 330 against the force of the loading spring. The toothed portion 331 is provided with ten indented portions around its periphery so that assembly 328 may be held in any of ten angular positions around shaft 311. Assembly 328 is positioned angularly around shaft 311 by engagement of the raised portion 316 of shaft 311 with an internally toothed portion of assembly 328.

Disposed circularly around shaft 311 and supported by the housing 310 is a series of ten smaller shafts, typified by shaft 332, upon which three gears 333, 334, 335 are mounted with an individual friction clutch arrangement (not shown) for each gear. A fourth gear 336 is rigidly attached to shaft 332 and engages a large gear 337 mounted coaxially with shaft 311. The idler gears 324, 325, 326 engage gears 333, 334, 335 respectively on shaft 332 when assembly 328 is in the angular position which permits them to do so, otherwise they engage similar gears on one of the other nine shafts.

Figure 3B:
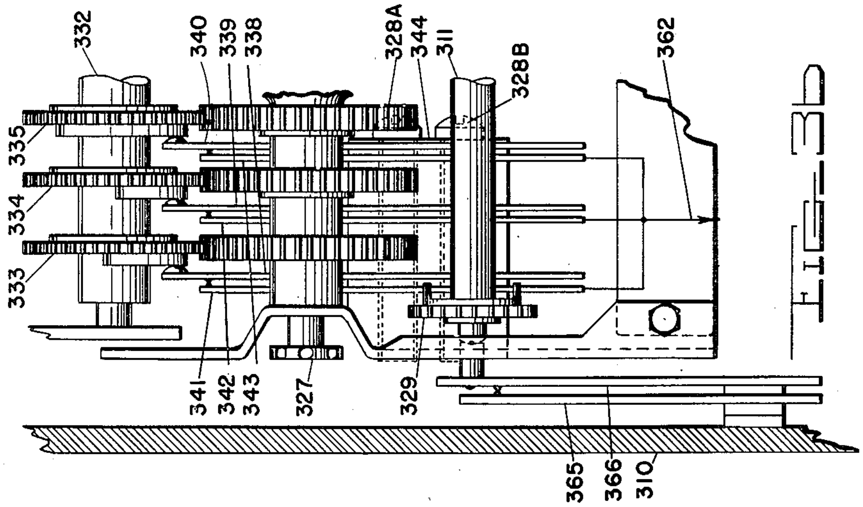

The back side of each of gears 333, 334, 335 bears a raised portion shown also in Figs. 3B and 3C extending angularly for approximately 180 degrees. These raised portions press against the insulated riders on bars 338, 339, 340, shown in Fig. 3–B. Thus the contacts between bars 341—338, 342—339, and 343—340 will be held closed by the raised portions of gears 333, 334, 335, when those gears are in certain angular positions on shaft 332. In other angular positions where the raised gear surfaces do not press against the insulated riders, the spring action of the bars is sufficient to hold the contacts apart.

A cut-away view of the contactor mechanism is shown in Fig. 3–B. The contact bar supporting assembly 344 (Fig. 3–B) is supported upon assembly 328 by the bolt members 328A, 328B in such a manner that the contact bars 338, 339, 340 will ride upon the raised cam surfaces of the gears 333, 334, 335 on a particular shaft typified by shaft 332 when those gears are meshed with the idler gears 324, 325, 326.

Wheel 337 is normally held in the maximum counterclockwise position as shown in Fig. 3A by an insulated pawl 345 engaging the maximum clockwise tooth (slot 346A) of series 346. In this condition a protrudance 347 on wheel 337 is held against bar 348 so that contact between bars 348, 349 is made and contact between bars 348, 350 and bars 351, 352 is broken. The latter contact (between bars 351, 352) is opened by means of an insulated member 348A fixedly attached to bar 348 or to bar 352.

The channel selection process is started by causing the closure of a switch 353 shown in Fig. 2 by the raised portions of the toothed wheel 331 as handwheel 312 is rotated in the maximum inward position. Pawl 345 is thus withdrawn from the toothed series 346 against the spring force of bar 354 by a relay 355. A spring 356 (Fig. 3) then causes rapid clockwise motion of wheel 337 until a maximum clockwise position is reached. In this position, a second protrudance 357 presses against bar 348 making contact between bars 348, 350 and bars 351, 352 and opening contact between bars 348, 349. With contact thus made between bars 351, 352 (Fig. 2), and between bars 452, 453 of the clutch mechanism (to be subsequently described), the stepper relay 358 is capable of actuation provided relay 355 is not energized (holding bar 354 out) so that contact is made between bars 354, 359.

When relay 358 becomes energized, subsequent to the clockwise motion of wheel 337, downward motion of the armature 360 causes ratchet 361 to engage a tooth in series 362A producing typically a 5 degree counterclockwise motion of wheel 337. As the armature of relay 358 reaches its maximum downward position, contact between bars 363, 360 is broken, deenergizing relay 358 permitting ratchet 361 to move upward to its original position. In the meantime, motion of wheel 337 causes pawl 345 to advance to a second tooth of series 346 so that wheel 337 is held in the new position. This stepwise action continues until wheel 337 reaches a maximum counterclockwise position as shown breaking contact between bars 351, 352 to prevent further actuation of relay 358. In the maximum downward position of the armature of relay 358, contact is made between bars 360, 362 grounding thereby the common bus 362 connected to bars 341, 342, 343 of Figs. 2, and 3B.

Rotation of wheel 337 causes rotation of the ten assemblies typified by those on the shaft 332. Thus the contacts (Fig. 3B) between bars 341, 338; 342, 339; and 343, 340 may individually be held closed or open in the various positions of wheel 337 depending upon the orientation of the partially raised cam surfaces on gears 333, 334, 335. The positions of these gears on shaft 332 are selectively variable and adjusted individually with handwheel 312 through shaft 311, gear 369 and the idler gears 324, 325, 326. Thus the bars 338, 339, 340 are grounded, individually, from zero to nine times depending upon the initial orientation of the raised cam portions on gears 333, 334, 335.

When it is desired to change the orientation of any of the gears similar to 333, 334, 335, on any of the ten shafts, the assembly 328 is first rotated until the idler gears 324, 325, 326 engage the gears 333, 334, 335 on the desired shaft (typified by shaft 332). This rotation is accomplished with shaft 311 full in, slidable member 322 resting in the indented portion 318. In this position the raised toothed portion 316 engages an internally toothed portion of assembly 328 so that rotation of shaft 311 is communicated to assembly 328.

With this first step completed, the handwheel 312 is withdrawn until the slidable member 322 rests in the indented portion 319. In this position the raised portion 316 does not engage assembly 328 and assembly 328 is held from motion by the slidable member 330 and the raised portion 331. Gear 369, however, now engages idler gear 324 so that rotation of shaft 311 will cause rotation of gear 333 on shaft 332, the latter shaft being held from motion by wheel 337. The friction clutch (not shown) associated with gear 333 permits this motion of gear 333 upon shaft 332. This process is then repeated for the individual realignment of gears 334, 335, on shaft 332 which is accomplished respectively with the slidable member 322 in indented positions 320, 321. Any sequence may be followed in setting gears 333, 334, 335 on shaft 332 since there is no interaction between them. It should be noted that each time any of these three gears is reset in this manner, operation of switch 353 (Fig. 2), from the raised portion 331 does not cause operation of the channel selector mechanism because contact between bars 365, 366 in the circuit of the pawl extractor relay 355 (Fig. 2) is broken. Also a gear 367 which operates a channel indicator 368 is not meshed with the raised portion 313 of shaft 311 when the slidable member 322 is in any of slots 319, 320, 321. Thus rotation of handwheel 312 in setting up a channel does not cause operation of the indicator mechanism.

To prevent accidental loss of a preset position of gears 333, 334, 335 on shaft 332 when changing from one channel to another and in all operations involving the meshing and unmeshing of gears it is essential that "synchro-mesh" type gearing, well known in the calculating machine art for example, be employed throughout.

Figure 4B:
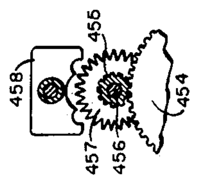

A clutch arrangement suitable for operating the tuning controls in the various units of the transmitter and receiver is shown in Figs. 4, 4A, 4B. The mechanical components are mounted in a supporting framework 410 which provides the necessary mechanical rigidity. A reversible electric motor 138 provides the driving power required in tuning. Rotation of the motor shaft is transmitted by gear 412 to a reducing gear train comprising gears 413, 414 mounted upon shaft 415, gears 416, 417 mounted upon shaft 418, and gear 419 mounted upon shaft 420. Thus shaft 420, driven through the complete reducing gear series, revolves more slowly than shaft 418 and similarly shaft 418 revolves more slowly than shaft 415. At the upper end (as shown in Fig. 4) of each shaft 415, 418, 420 is located a flat, radially toothed gear 421, 422, 423, respectively. These gears are capable of engaging similar radially toothed gears 424, 425, 426 mounted on a second series of shafts 427, 428, 429. Shafts 427, 428, 429 are interconnected by means of a series of three gears 430, 431, 432 of similar size. A fourth gear 433 engages gear 432 to transmit the motion of gear 432 to a shaft 434. The pairs of radially toothed flat gears 421, 424; 422, 425 and 423, 426 are normally held apart by the action of three springs 435, 436, 437 however, whenever one of the relays 438, 439, 440 becomes actuated, the armature of that relay forces the corresponding shaft 427, 428, 429 downward causing that pair of the radially toothed gears to mesh. The four gears 430, 431, 432, 433 are provided with sufficiently broad toothed surfaces so that they will remain engaged despite longitudinal motion of their shafts as the "clutches" become engaged. It should be noted (from Fig. 2) that actuation of only one relay at any given instant is possible, thus binding of the gear train does not occur; however, a friction clutch (not shown) may be employed between the motor and gear train as a precautionary measure.

Rotation of shaft 434 is applied to an assembly comprising gears 441, 442 (Fig. 4A) by means of a worm type reducing gear 443.

Shaft 444, the main tuning drive shaft, is rotatably mounted within structure 410 and is attached to the variable frequency control elements of the transmitter and receiver systems, as well as those of the variable oscillator 110 and the frequency divider 111. An assembly consisting of gears 441, 442 is rotatably mounted upon shaft 444; however, actuation of the master clutch relay 445 causes sleeve 446 to move to the right (in Fig. 4A) against the force of spring 447. A collar 448 is rigidly attached to shaft 444. Upon an extension of this collar is pivotally arranged a movable claw 449 which is engaged by sleeve 446. Motion of sleeve 446 to the right (in Fig. 4A) causes claw 449 to engage one of the teeth on gear 442 so that motion of the assembly 441—442 is transmitted to shaft 444. A second spring 450 is mounted upon an enlargement of shaft 444 and is attached to said shaft and the supporting structure 410 in such a manner as to exert a force tending to produce counter-clockwise rotation of shaft 444 (Fig. 4). When relay 445 is not actuated, this spring causes the shaft to be held in a counter-clockwise position Fig. 4 against a stop (not shown). In this position a cam 451 causes closure of contacts between bars 452, 453. As shown in Fig. 2, a situation wherein contact between bars 452, 453 is not made, prevents the application of power to relay 358 until the spring 450 returns the tuning mechanism attached to shaft 444 to a zero reference position.

A gear 454 is firmly attached to shaft 444 and transmits motion of that shaft to a gear 455 on a second shaft 456. A second gear 457 on shaft 456 provides, with the spring loaded rocker mechanism 458 of (Fig. 4B) an escapement mechanism which provides a retarding force to prevent too-rapid motion of shaft 444 which could cause possible damage to the variable tuning elements.

Fig. 5 shows the various frequencies available (after doubling) with each of crystals 120, 121, 122, 123, 124. These frequencies will produce 25 kc. beat signals in mixer 127 with the signals from amplifier 118 when the frequency of the output signal from the selective amplifier 117 is as shown in the columns headed "upper" and "lower" in Fig. 5. Thus the frequency of the zero beat points is altered as switch U–5 is operated. A change of 50 kc. in the zero beat points is produced as operation is changed by means of switches U–3, U–4 from a lower to an upper 25 kc. beat point.

From the foregoing discussion it is apparent that considerable modification of the features of this invention are possible, and while the devices herein described and the form of apparatus for the operation thereof, constitute a preferred embodiment of the invention it is to be understood that the invention is not limited to these precise devices and forms of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A selective frequency generating system, comprising; a variable oscillator, oscillator drive means for tuning the oscillator in a known direction of changing frequency from a known initial frequency point, a frequency division system producing division of the frequency of the signal output from the variable oscillator, a first fixed frequency source, a harmonic generating system responsive to the first fixed frequency source producing a spectrum of frequencies with components at multiples of the frequency of the fixed frequency source, first mixing means combining the output signals from said frequency divider and said harmonic generating system and producing beat signals therefrom, a first frequency selective circuit fed by the first mixer for producing an output signal as the changing frequency of the variable oscillator causes the beat signal to pass the selected frequency, a second fixed frequency signal source operating at a frequency near that of the first frequency selective circuit, second mixing means combining the signal from said second fixed frequency signal source and the signal from said first frequency selective circuit and producing a second beat signal therefrom a second frequency selective circuit fed by the second mixer and having low-pass characteristics for selecting the frequency output of said second mixing means occurring near zero beat frequency, produced when the beat signal from said first frequency selective device is near the frequency of the second fixed frequency source, power amplification and amplitude limiting circuits operable from the output signals from said second frequency selective circuit, a third frequency selective circuit operable from the output of said amplification and limiting circuits and having high and low frequency selective characteristics, said third selective circuit producing output into a first channel when the beat frequency input is in the lower part of the frequency responsive band of the second frequency selective circuit and into a second channel when the beat frequency input is in the upper part of the frequency band of the second frequency selective circuit, and oscillator drive control means including a plurality of relay operated switches connected to the output of said channels responsive to signals therein for counting beat points produced as the variable oscillator is swept in frequency, for altering the frequency sweep when predetermined numbers of signal beat points are realized and for maintaining the variable oscillator frequency at a frequency producing a preselected beat frequency in the output of said second frequency selective device.

2. A selective frequency generating system, comprising; a variable oscillator, oscillator drive means for tuning the oscillator in a known direction of changing frequency from a known initial frequency point, a frequency division system producing division of the frequency of the variable oscillator signal, a first fixed frequency signal source, a harmonic generating system responsive to the first fixed frequency source producing a spectrum of frequencies with components at multiples of the frequency of the fixed frequency signal source, first mixing means combining the output signals from said frequency divider and said harmonic generating system and producing beat signals therefrom, a first frequency selective circuit fed from the first mixer for producing an output signal as the changing frequency of the variable oscillator causes the beat frequency signal to pass the selected frequency, a second frequency stable signal source operating at a frequency near the output frequency of the first frequency selective circuit, second mixing means combining the signal from said frequency stable signal source and the signal from said first frequency selective circuit and producing a second beat signal therefrom, a second frequency selective circuit fed by the second mixer and having low pass characteristics up to a frequency substantially equal to half the frequency of the first fixed frequency signal source for selecting the frequency output component of said second mixing means occurring near zero beat frequency, means for changing the frequency of the second frequency stable signal source by an amount substantially equal to a fraction of the frequency of the first fixed frequency signal source to change thereby the frequency of the signal from the first frequency selective circuit at which the aforementioned near zero beat frequency component in the output of the second mixing means occurs, power amplication and amplitude limiting circuits operable from the output signal of said second frequency selective circuit, a third frequency selective circuit operable from the output of said amplification and limiting circuits and having low frequency selective output characteristics into a first control channel over an input frequency range from substantially zero to near one fourth of the frequency of the first fixed frequency source and high frequency selective output into a second control channel over the input frequency range from near one fourth to substantially one half of the frequency of the first fixed frequency source, and oscillator drive control means including a plurality of relay operated switches connected to the output of said control channels responsive to signals therein for counting beat signal points produced as the variable oscillator is swept in frequency, for altering the frequency sweep when predetermined numbers of beat signal points are realized and for maintaining the variable oscillator frequency at a frequency producing, in the output of said second frequency selective device, a preselected beat frequency nearly equal to one fourth of the frequency of the first fixed frequency source.

3. A system as described in claim 2, comprising additionally, a beat frequency counting and frequency maintaining circuit, comprising; a first multi-position, multi-contact switch assembly for selecting the frequency of the signal from the first frequency selective circuit at which the near zero beat frequency signal in the output from the second mixing means occurs, a second multi-position, multi-contact switch assembly for selecting the units digits of the number of beat frequency points produced during the desired frequency sweep, additional multi-position, multi-contact, switch assemblies for selecting the higher order digits of the number of beat frequency points desired during the frequency sweep, a control box, means placing each of said switch assemblies in reference contact positions when a selection process is initiated from said control box, contacts on said switches causing return of the variable oscillator to an initial frequency position at the start of a selection process, means moving said first assembly to a final contact position in response to signals from the control box, means moving other contact assemblies to intermediate positions in response to further signals from the control box, contact means initiating a frequency sweep of the variable oscillator when all of said other switch assemblies reach their intermediate positions, means moving each of said other switch assemblies to its final contact position in response to signals produced as the near zero beat frequency output signals are passed, contact means stopping said frequency sweep when all of said other switch assemblies reach their final contact positions, and means controlling the variable oscillator to hold a selected beat frequency output from the second mixing means of claim 2.

4. A control box for regulating the number of pulse signals applied to each of a multiplicity of control channels during a selection operation, comprising; a supporting structure, a first shaft pivotally mounted by the supporting structure in a manner permitting longitudinal and rotational motion thereof, means for producing said motion of said shaft, a plurality of secondary shaft members circularly disposed around said first shaft and parallel thereto, each of said secondary shafts provided with a multiplicity of gear members equal in number to the number of control channels, each of said gear members provided with a partially raised cam portion and fixedly attached to the corresponding secondary shaft in a manner permitting motion thereon only with difficulty, a multiplicity of switches in number equal to the number of selector control channels selectively operated by the raised portions of said gear members on a selectable one of said secondary shafts, means producing pulse signals and causing the rotation of said secondary shafts and the gears mounted thereon, said rotation of said secondary shafts functioning to move the raised portions of the gear members and thus alter the number of pulse signals received by each selector control channel, means moving said switches to selective operation by the gear members of any particular secondary shaft, and means altering individually the position of said gear members upon said secondary shafts.

References Cited in the file of this patent

UNITED STATES PATENTS

| | | |
|---|---|---|
| 2,317,547 | McRae | Apr. 27, 1943 |
| 2,379,395 | Ziegler et al. | June 26, 1945 |
| 2,380,288 | Bligh et al. | July 10, 1945 |
| 2,408,826 | Vogel | Oct. 8, 1946 |
| 2,419,593 | Robinson | Apr. 29, 1947 |
| 2,523,106 | Fairbairn et. al | Sept. 19, 1950 |
| 2,543,058 | Ranger | Feb. 27, 1951 |